(12) United States Patent
Li et al.

(10) Patent No.: US 11,427,272 B2
(45) Date of Patent: Aug. 30, 2022

(54) SPECIAL ROBOT WITH COMPLEX TERRAIN ADAPTIVE FUNCTION AND A MOTION AND OPERATION METHOD THEREOF

(71) Applicant: Qingdao Agricultural University, Qingdao (CN)

(72) Inventors: Juan Li, Qingdao (CN); Fengli Ge, Qingdao (CN); Hongwei Gao, Qingdao (CN); Ying Xiao, Qingdao (CN)

(*) Notice: Subject to any disclaimer, the term of this patent is extended or adjusted under 35 U.S.C. 154(b) by 0 days.

(21) Appl. No.: 17/525,733

(22) Filed: Nov. 12, 2021

(65) Prior Publication Data

US 2022/0063739 A1    Mar. 3, 2022

Related U.S. Application Data

(63) Continuation of application No. PCT/CN2019/104834, filed on Sep. 9, 2019.

(30) Foreign Application Priority Data

Jul. 31, 2019 (CN) .................... 201910699762.8

(51) Int. Cl.
*B62D 55/116* (2006.01)
*B62D 55/075* (2006.01)
(Continued)

(52) U.S. Cl.
CPC .......... *B62D 55/116* (2013.01); *B25J 9/1666* (2013.01); *B62D 55/075* (2013.01); *B62D 55/084* (2013.01)

(58) Field of Classification Search
CPC ... B62D 55/116; B62D 55/075; B62D 55/084
(Continued)

(56) References Cited

U.S. PATENT DOCUMENTS 4,124,124 A    11/1978  Rivet
9,096,264 B2 *  8/2015  Connors ................ A01C 7/208
(Continued)

FOREIGN PATENT DOCUMENTS

CN    104108431 A    10/2014
CN    104875802 A     9/2015
(Continued)

OTHER PUBLICATIONS

Internation Search Report of PCT/CN2019/104834, dated Apr. 21, 2020.

*Primary Examiner* — Anne Marie M Boehler

(57) ABSTRACT

Disclosed are a special robot with complex terrain adaptive function and a motion and operation method thereof. The special robot comprises a crawler chassis, a shock absorption suspension assembly, a suspension adaptive adjustment assembly and an electronic control assembly. The present disclosure achieves an adaptive angle adjustment on the left and right sides of the shock absorption suspension assembly, including the independent pitch angle and roller angle adjustment on the left and right sides of the shock absorption suspension assembly by the configuration of structures such as the suspension adaptive adjustment assembly and then achieves the adaptability of the robot on complex and tough pavement conditions by the combination with a sensor for pavement perception, which ensures walking performance and attachment ability of mechanisms, further improves the load-bearing performance of the crawler robot, ensures the safety, stability and adaptability of the mobile platform.

4 Claims, 12 Drawing Sheets

(51) Int. Cl.
*B62D 55/084* (2006.01)
*B25J 9/16* (2006.01)

(58) Field of Classification Search
USPC .................................... 180/9.32, 9.5, 9.52
See application file for complete search history.

(56) References Cited

U.S. PATENT DOCUMENTS

| | | | |
|---|---|---|---|
| 9,688,322 B1* | 6/2017 | Prickel ................ | B62D 55/084 |
| 2015/0367901 A1* | 12/2015 | Studer ................. | B62D 55/116 |
| | | | 180/9.42 |
| 2016/0362149 A1* | 12/2016 | Erlinger ............... | E02F 9/2257 |

FOREIGN PATENT DOCUMENTS

| | | |
|---|---|---|
| CN | 105150834 A | 12/2015 |
| CN | 204937293 U | 1/2016 |
| CN | 208746112 U | 4/2019 |
| FR | 3058702 A1 | 5/2018 |
| GB | 804240 A | 11/1958 |
| JP | 2007302083 A | 11/2007 |

* cited by examiner

SPECIAL ROBOT WITH COMPLEX TERRAIN ADAPTIVE FUNCTION AND A MOTION AND OPERATION METHOD THEREOF

CROSS-REFERENCE TO RELATED APPLICATIONS

This application is a continuation of International Application No. PCT/CN2019/104834 with a filling date of Sep. 9, 2019, designating the United States, now pending, and further claims to the benefit of priority from Chinese Application No. 201910699762.8 with a filing date of Jul. 31, 2019. The content of the aforementioned applications, including any intervening amendments thereto, are incorporated herein by reference.

TECHNICAL FIELD

The present disclosure relates to the engineering machinery technical area, more specifically relates to a special robot with complex terrain adaptive function and a motion and operation method thereof.

BACKGROUND

The crawler chassis has advantages such as operation flexibility, excellent loading performance and strong obstacle crossing capacity and it is often used as a movement platform of a special robot under complex and tough pavement. As the crawler chassis has stronger obstacle crossing capacity and walking ability for complex terrain due to the configuration of the suspension and shock absorption mechanisms compared with the wheel chassis. The crawler chassis and the attached suspension structures act as the walking mechanisms of the related machinery and they always develop toward high adaptability, high motion ability, safety reliability and motion stability.

The suspension structure of the existing crawler chassis generally uses a fixed structure and the angle of the suspension system cannot be changed when it motions. When the suspension structure walks through complex pavement with "\/"-shaped, "/\"-shaped cross sections or with different gradients on other sides, obstacles or rampways, the stability of the chassis operation decreases, the force of the suspension system is uneven and severe deformation will occur to the crawler, which can bring damages ranging from crawler breaking or lost to a broken car body and even car turnover due to uneven force on the crawler structure on the left and right sides and will compromise the lifespan of the crawler chassis greatly, thereby being a great challenge to the walking performance and obstacle crossing capacity of the chassis.

At present, some crawler chassis has a shock absorption suspension system with specific structures which is divided into symmetric suspension structures provided on the left and right sides. In order to improve the waling ability of the crawler chassis on the complex pavement, the following two solutions are generally adopted:

(1) a mechanical lifting mechanism is used to achieve the chassis height of the robot in walking procedure so as to achieve obstacle crossing. A typical technical solution is an adjustable crawler device published by the literature with patent No. 201810575356.6, which achieves height adjustment on the chassis by adjusting the length of a hydraulic rod, thereby increasing the walking performance of the crawler chassis.

(2) the inclination angle in the front and rear side of the shock absorption suspension system is changed to achieve the adaptability to the slope, thereby compensating the inclination angle of the robot crawler chassis and improving the stability of the platform. A typical technical solution is the adaptive leveling chassis published by the literature with patent No. 201610975634.8, which uses the combination of wheels and suspension racks, wherein each suspension rack is highly adaptively adjustable to decrease the changed amount to the inclination angle and the pitch angle of the chassis caused by terrain changes, thereby achieving a dynamic adjustment on the chassis.

Only adjustments on the chassis height or front and rear pitch angles exist in the prior art, merely capable of leveling the operation angle of the chassis and incapable of solving the problem of chassis obstacle crossing essentially.

BRIEF SUMMARY OF THE INVENTION

With regard to the above technical problems, the present disclosure provides a special robot with complex terrain adaptive function which can change the pitch and roll operation angles of the suspension structure in both sides of the crawler chassis, thereby allowing the suspension system and the crawler system to better attach the pavement and improve the climbing and obstacle crossing ability of the chassis.

The technical solution used in the present disclosure is:

A special robot with complex terrain adaptive function comprising a crawler chassis, a shock absorption suspension assembly, a suspension adaptive adjustment assembly and an electronic control assembly;

the crawler chassis comprises a chassis body in a frame structure, two side surfaces of the chassis body are configured with a suspension supporting side plate, the top surface, the bottom surface, the front surface and the rear surface of the chassis body are all configured with a stationary cover plate;

the shock absorption suspension assembly is provided with two sets respectively located on two sides of the crawler chassis; the shock absorption suspension assembly comprises a suspension body and a crawler, two sides of the suspension body are configured with a driving wheel and a driven wheel, the upper part of the suspension body is alternately configured with a track roller, the bottom part of the suspension body is alternately configured with a load wheel connected with a tensioning mechanism controlling the crawler tensioned thereby, the crawler is configured to surround the outer contour consisting of the track roller, the driving wheel, the driven wheel and the load wheel;

the suspension adaptive adjustment assembly is provided with two sets respectively located close to rear of two sides of the chassis body and is used to achieve the angle adjustment of the shock absorption suspension assembly, each set of the shock absorption suspension assembly corresponds to one set of the suspension adaptive adjustment assembly;

the suspension adaptive adjustment assembly comprises a steering motor, a primary gear, a secondary gear, a steering gear, a power transmission mechanism and a fixing mechanism; the steering motor comprises a first steering motor and a second steering motor placed in parallel and all provided on the rear end of the suspension supporting side plate; the primary gear comprises a first primary gear and a second primary gear, the secondary gear comprises a first secondary gear and a second secondary gear, the first primary gear and the second primary gear are respectively configured on the rotation axis of the first steering gear and the second steering motor and are respectively engaged with the first secondary gear and the second secondary gear, the steering gear is configured between the first secondary gear and the second secondary gear and is respectively engaged with the first secondary gear and the second secondary gear; the center of the steering gear is connected to one end of a hollow shaft, and the other end of the hollow shaft is fixedly connected to the rear end of the suspension body;

the power transmission mechanism comprises a driving shaft, a universal joint and a driven shaft, the universal joint is connected between the driving shaft and the driven shaft;

the fixing mechanism comprises a first fixing rod and a second fixing rod, the first fixing rod is in a T-shaped hollow rod structure, the first steering motor and the second steering motor are connected to the trailing end of the first fixing rod, the first secondary gear and the second secondary gear are respectively connected to both front ends of the first fixing rod, the first secondary gear and the second secondary gear are connected through a rigid shaft, the rigid shaft passes through the front end of the first fixing rod, both outside ends of the rigid shaft are configured with a shaft sleeve; the second fixing rod is in a U-shaped structure and stretches across the first secondary gear and the second secondary gear, both ends of the second fixing rod are respectively fixed to the shaft sleeves where the rigid shaft passes through both outside ends of the first secondary gear and the second secondary gear, where the center of the second fixing rod corresponds to the center of the steering gear is connected with a fixing seat, the hollow shaft connected to the steering gear passes vertically through the fixing seat and can freely rotate in relative to the fixing seat;

the electronic control assembly comprises a controller, a sensor, an actuator and a power motor, the controller is connected to the sensor and the actuator, the actuator is respectively connected to the power motor and the steering motor, the power motor is connected to the driving shaft of the power transmission mechanism, the driven shaft of the power transmission mechanism is connected to the driving wheel of the shock absorption suspension assembly.

The beneficial technical effect of the present disclosure is:

The present disclosure achieves an adaptive angle adjustment on the left and right sides of the shock absorber suspension assembly including the independent pitch angle and the roller angle adjustment on the left and right sides of the shock absorption suspension assembly by the configuration of structures such as the suspension adaptive adjustment assembly and then achieves the adaptability of the robot on complex and tough pavement conditions by the combination with a sensor for pavement perception, which ensures walking performance and attachment ability of mechanisms such as the crawler on different complex pavement obstacles, further improves the load-bearing performance of the crawler robot, ensures the safety, stability and adaptability of the mobile platform and is of great meaning for the robot to improve the high performance, adaptability, high stability and intelligence on motions under complex environment.

DETAILED DESCRIPTION OF PREFERRED EMBODIMENTS

Figure 1:
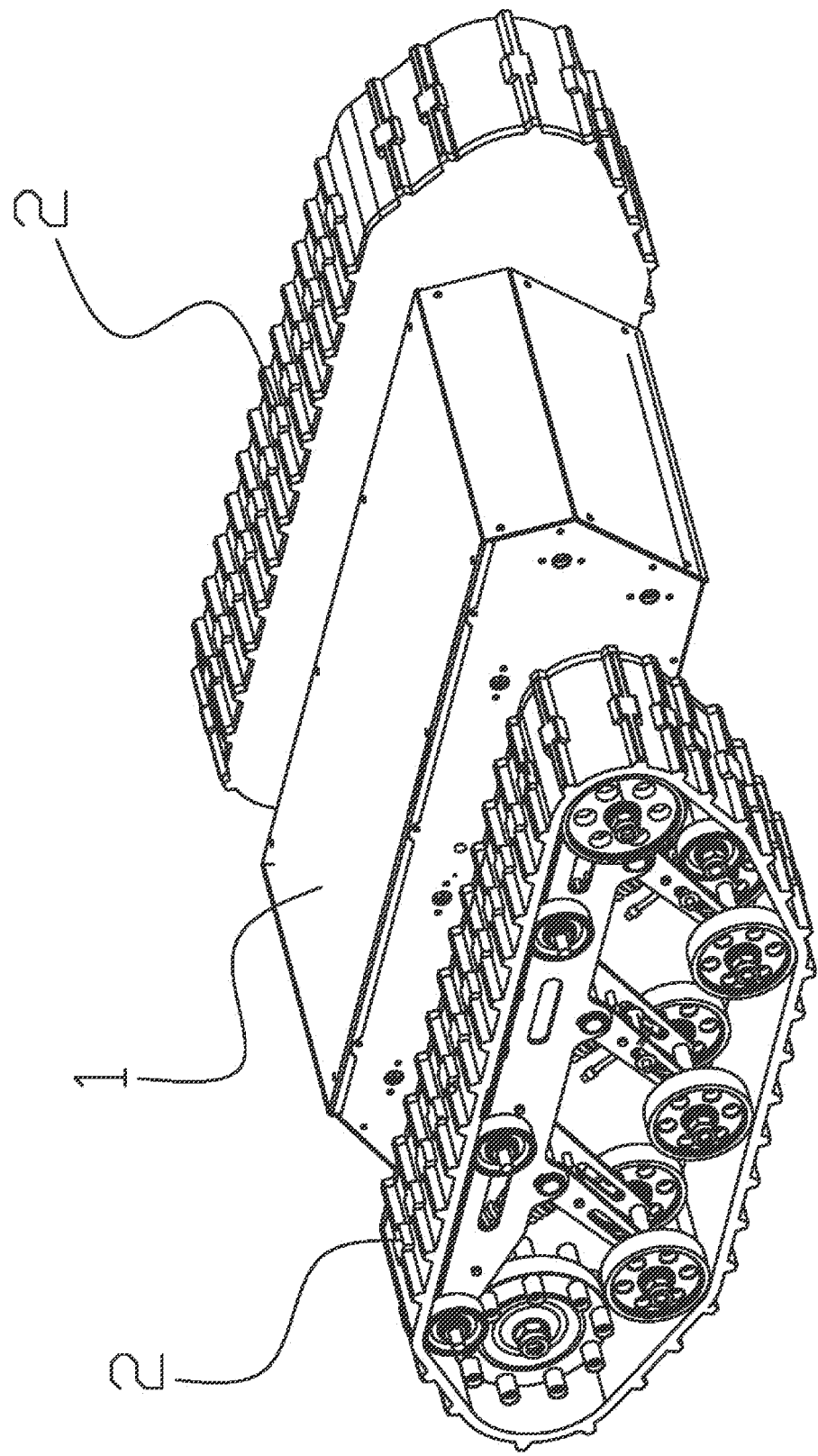
FIG. 1 is a perspective structure diagram of the special robot with complex terrain adaptive function in the present disclosure.
Figure 2:
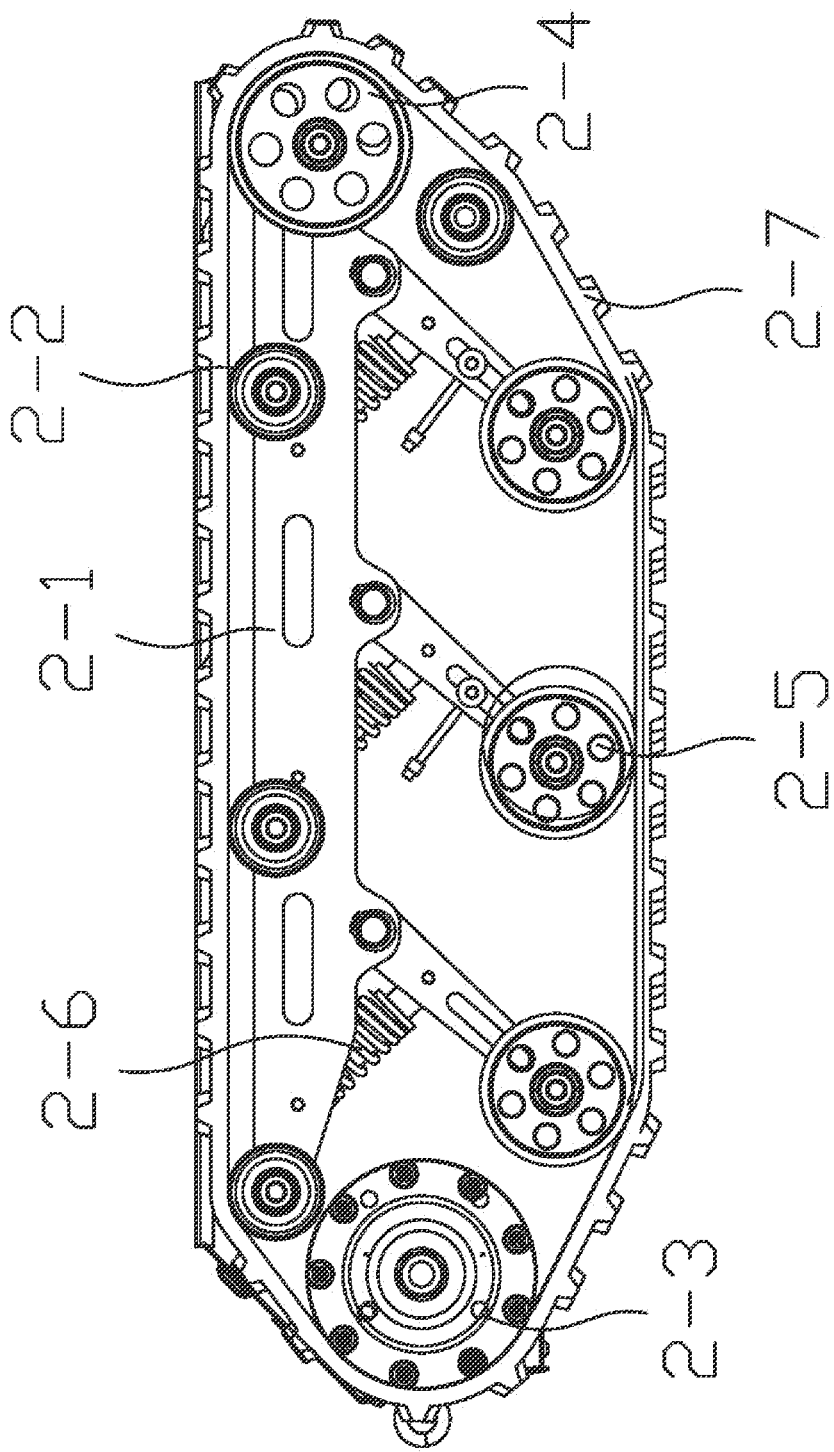
FIG. 2 shows a view structure diagram of the shock absorption suspension system of the special robot with complex terrain adaptive function in the present disclosure when seen in a direction perpendicular to the movement direction of the special robot in FIG. 1.
Figure 3:
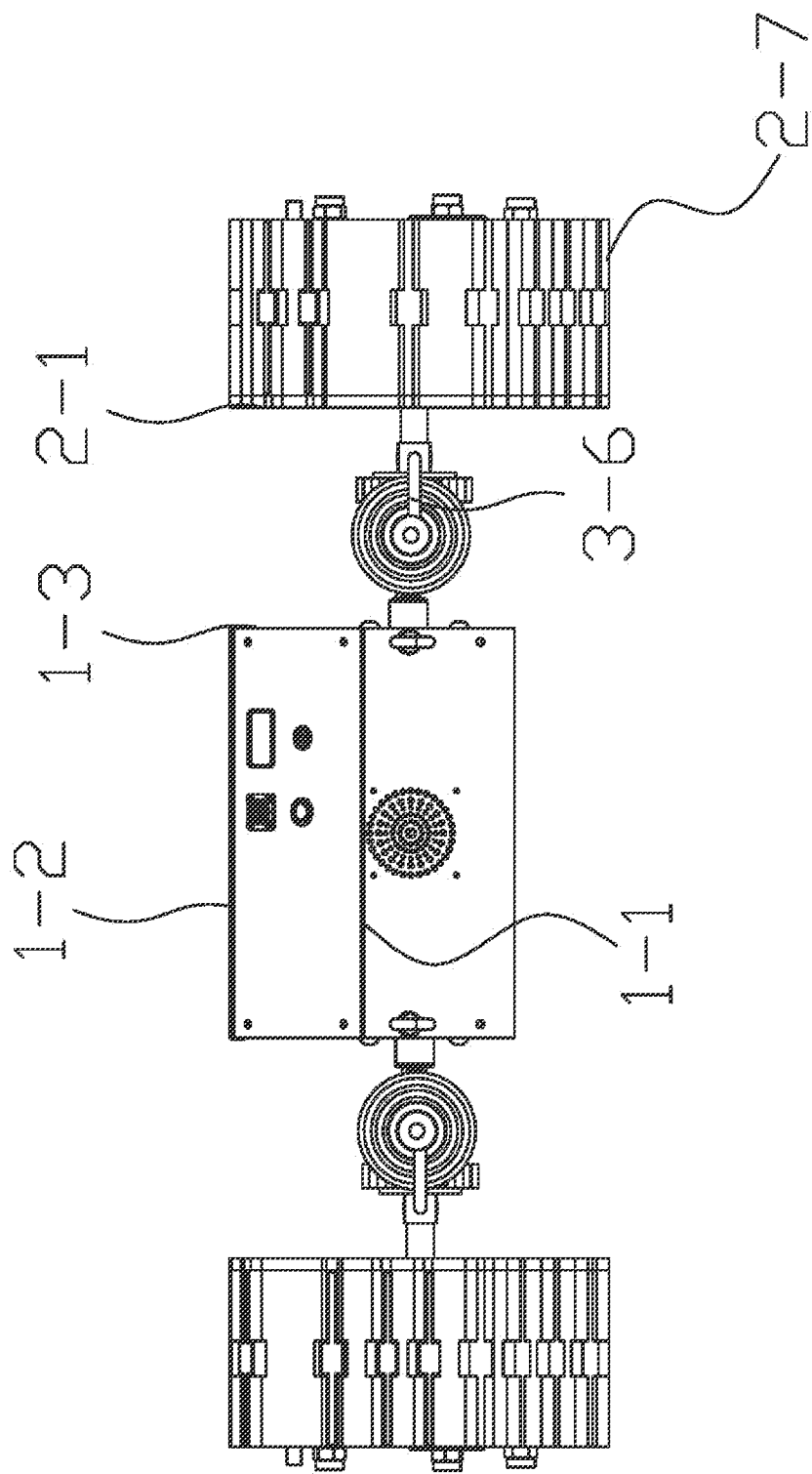
FIG. 3 is a view structure diagram of the special robot with complex terrain adaptive function in the present disclosure when seen in a direction parallel to the movement direction of the special robot in FIG. 1.
Figure 4:
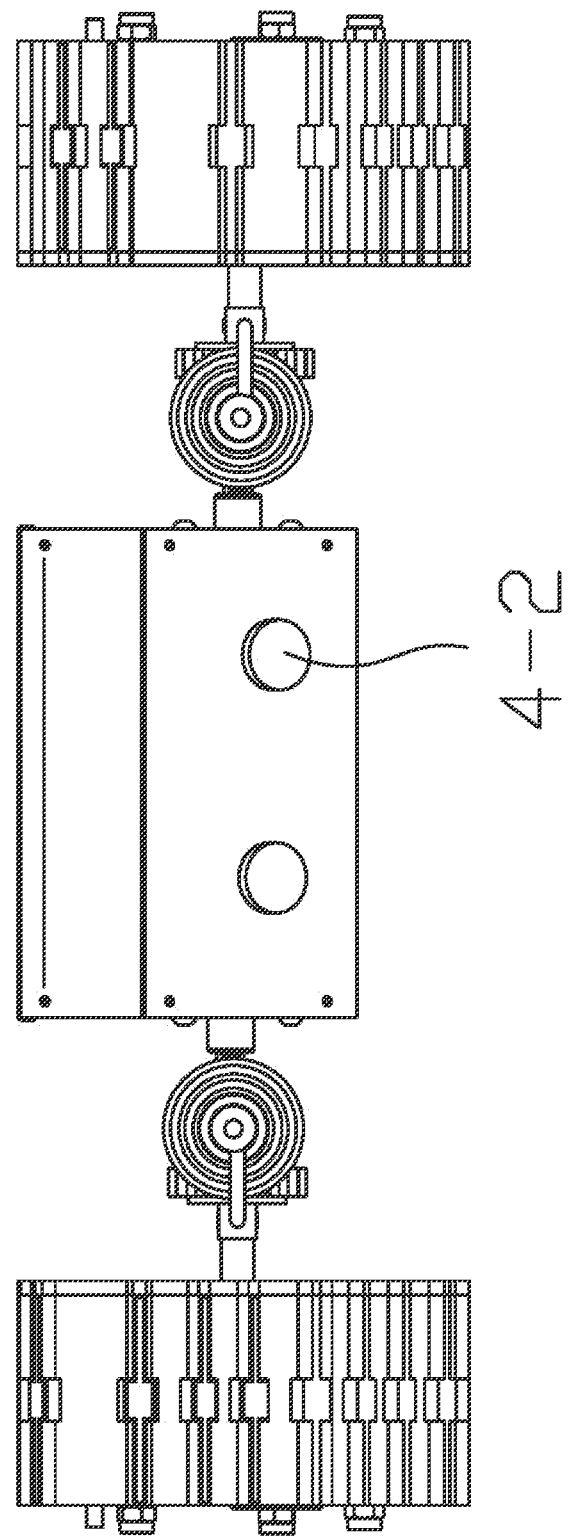
FIG. 4 is another view structure diagram of the special robot with complex terrain adaptive function in the present disclosure when seen in a direction opposite to the direction of seeing the special robot in FIG. 3.
Figure 5:
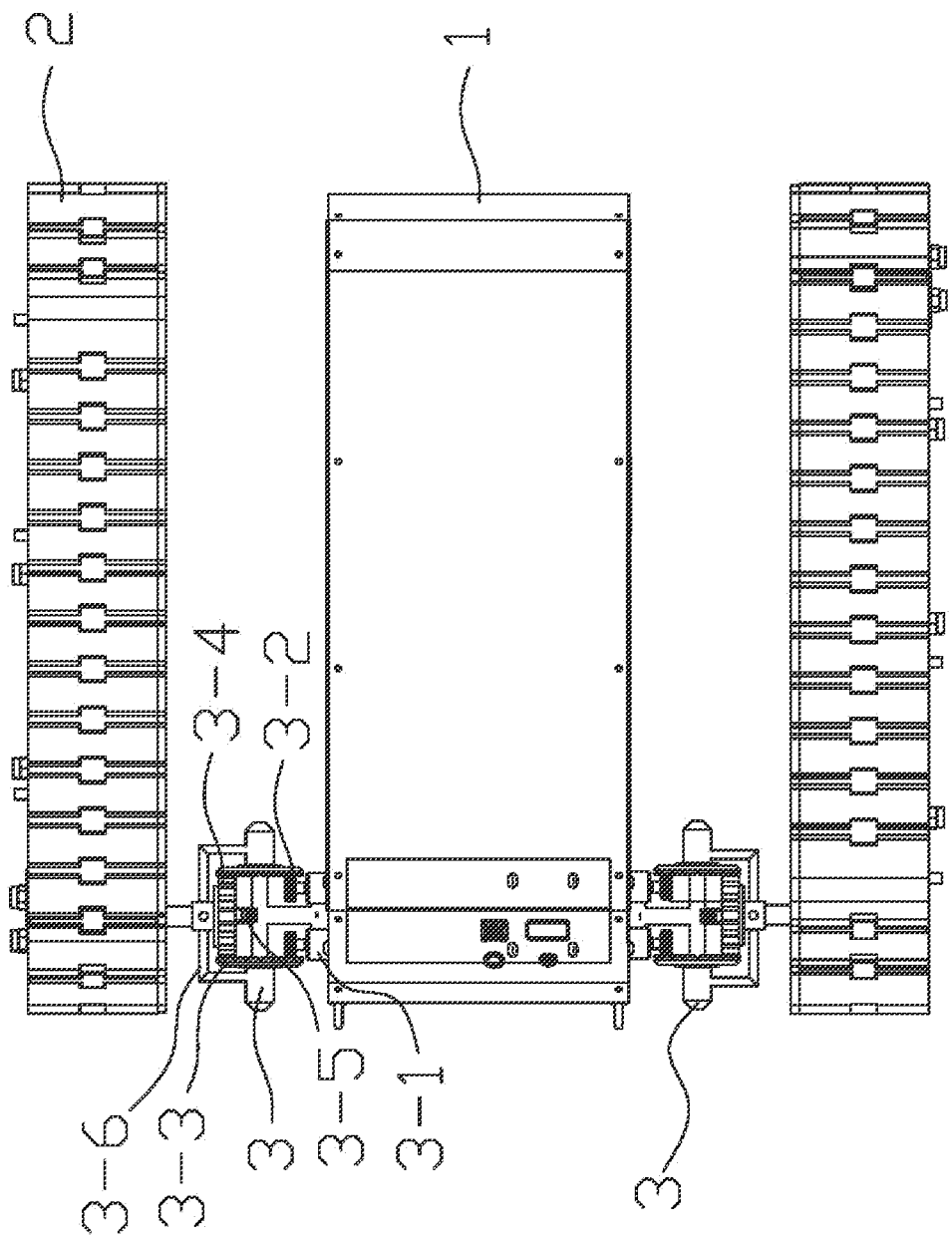
FIG. 5 is a top view structure diagram of the special robot with complex terrain adaptive function in the present disclosure.
Figure 6:
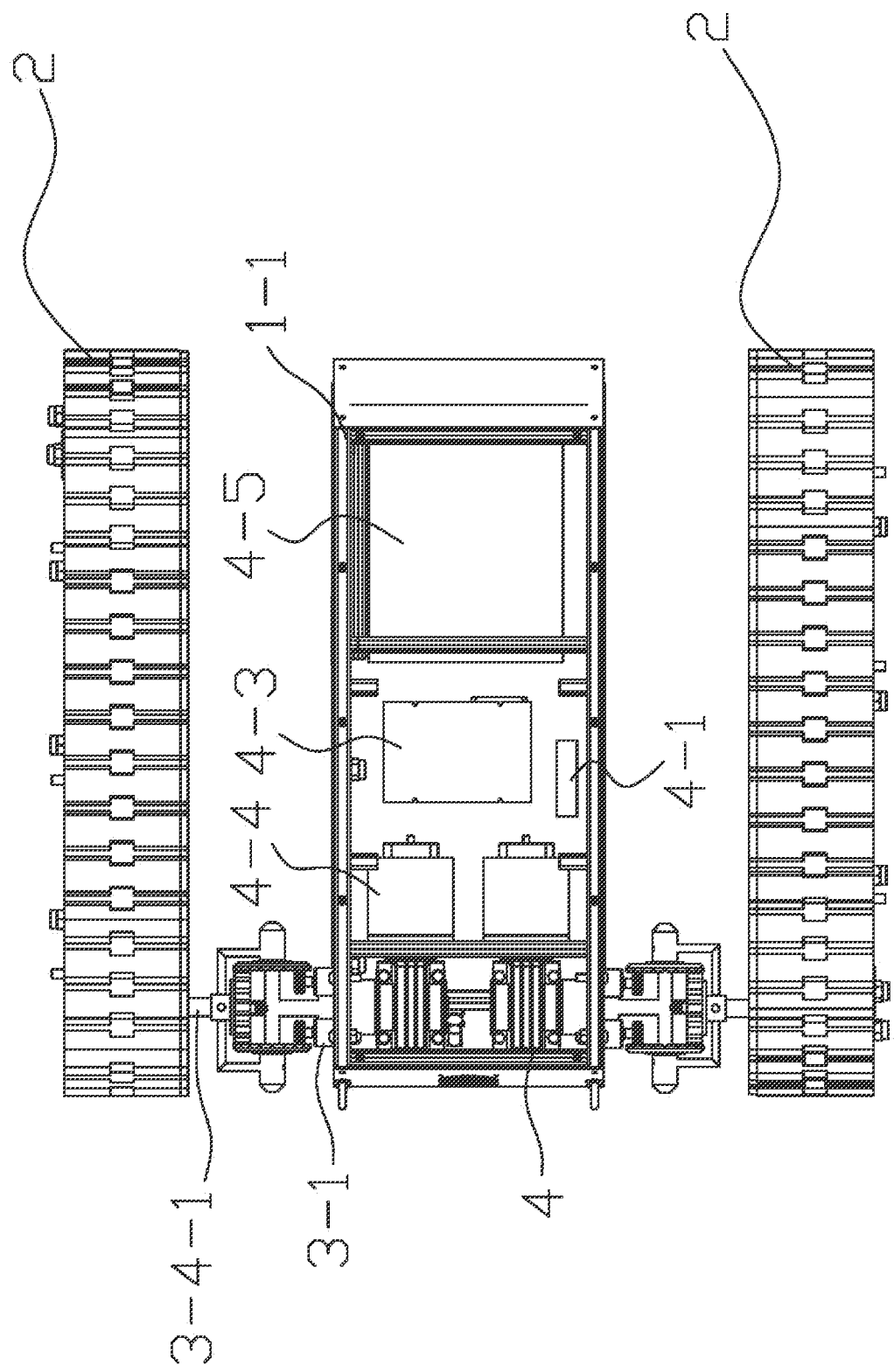
FIG. 6 is a bottom view structure diagram of the special robot with complex terrain adaptive function in the present disclosure.
Figure 7:
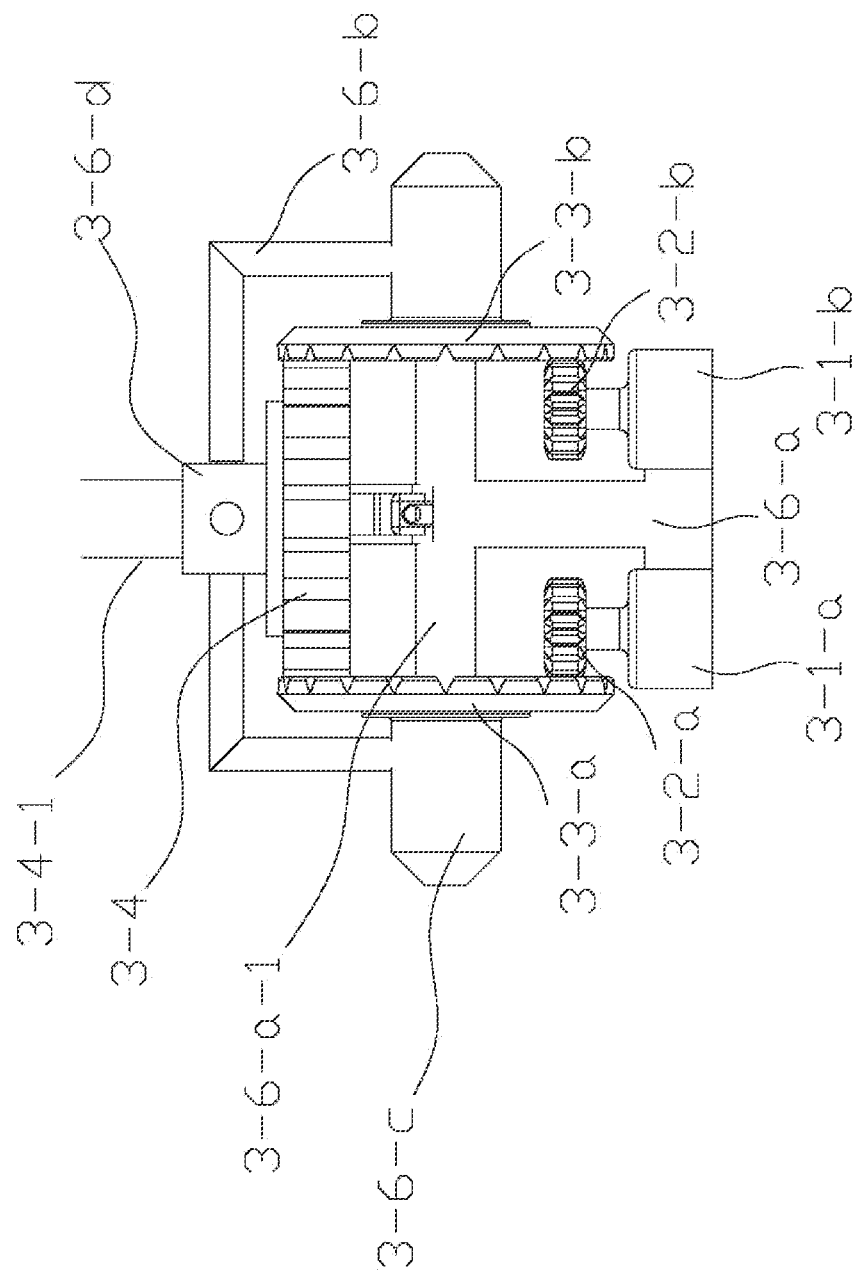
FIG. 7 is a structural schematic diagram of the suspension adaptive assembly of the special robot in the present disclosure.
Figure 8:
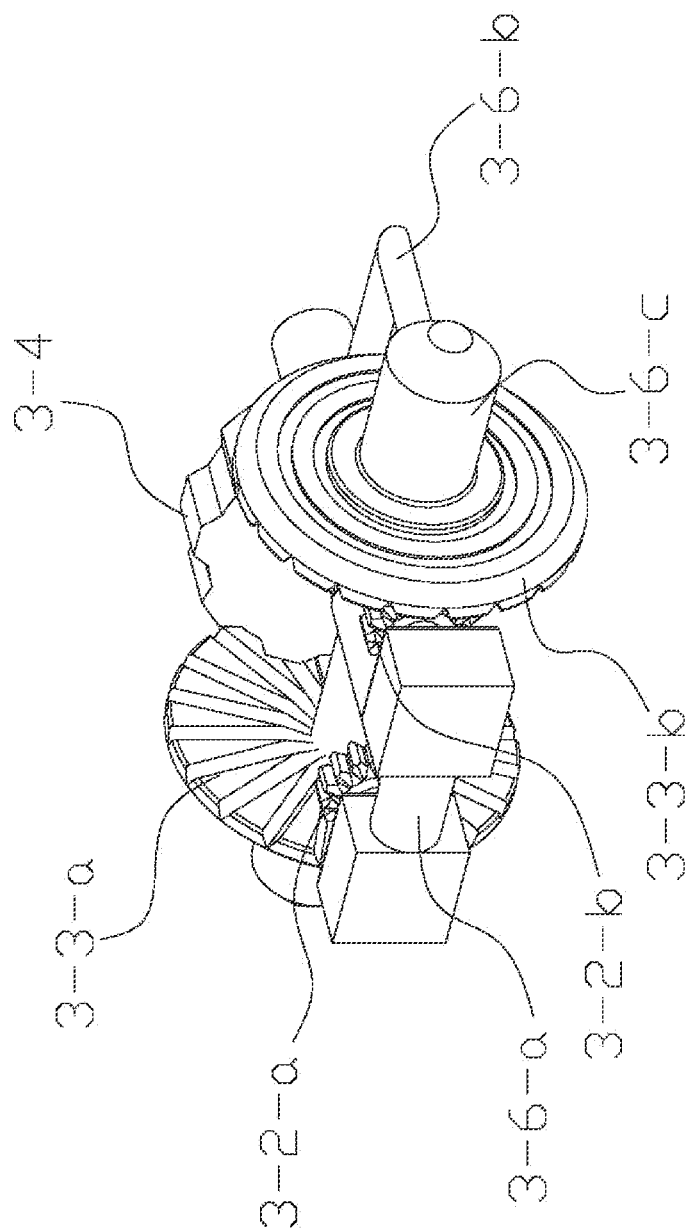
FIG. 8 is a perspective structure diagram of the mutually engaged primary gear, secondary gear and steering gear in FIG. 7.
Figure 9:
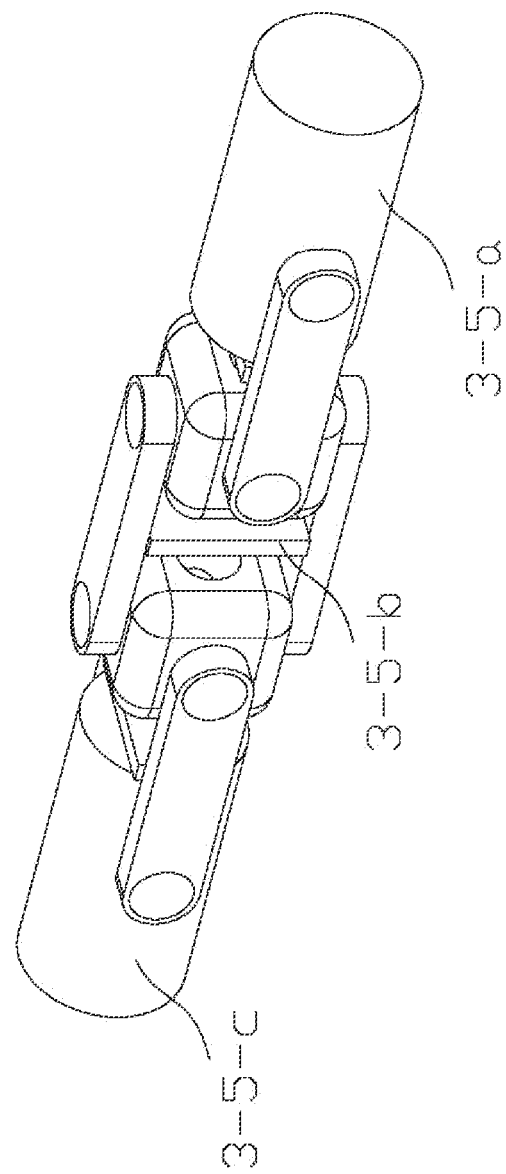
FIG. 9 is a structural schematic diagram of the power transmission mechanism of the special robot in the present disclosure.
Figure 10:
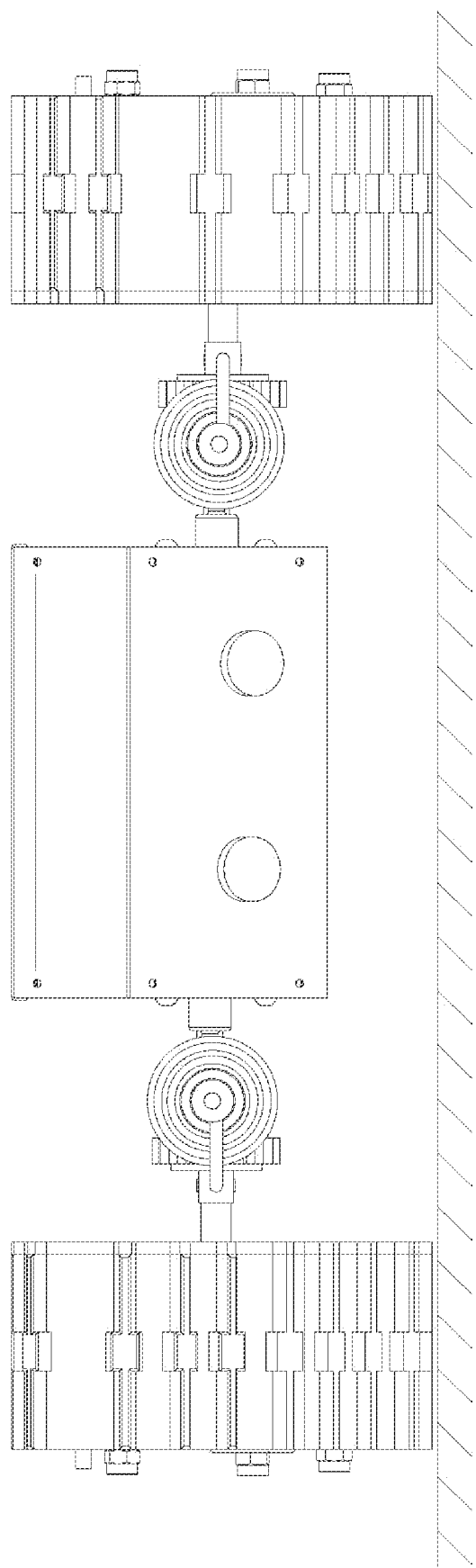
FIG. 10 is a status diagram of the special robot in the present disclosure when walking through normal pavement.
Figure 11:
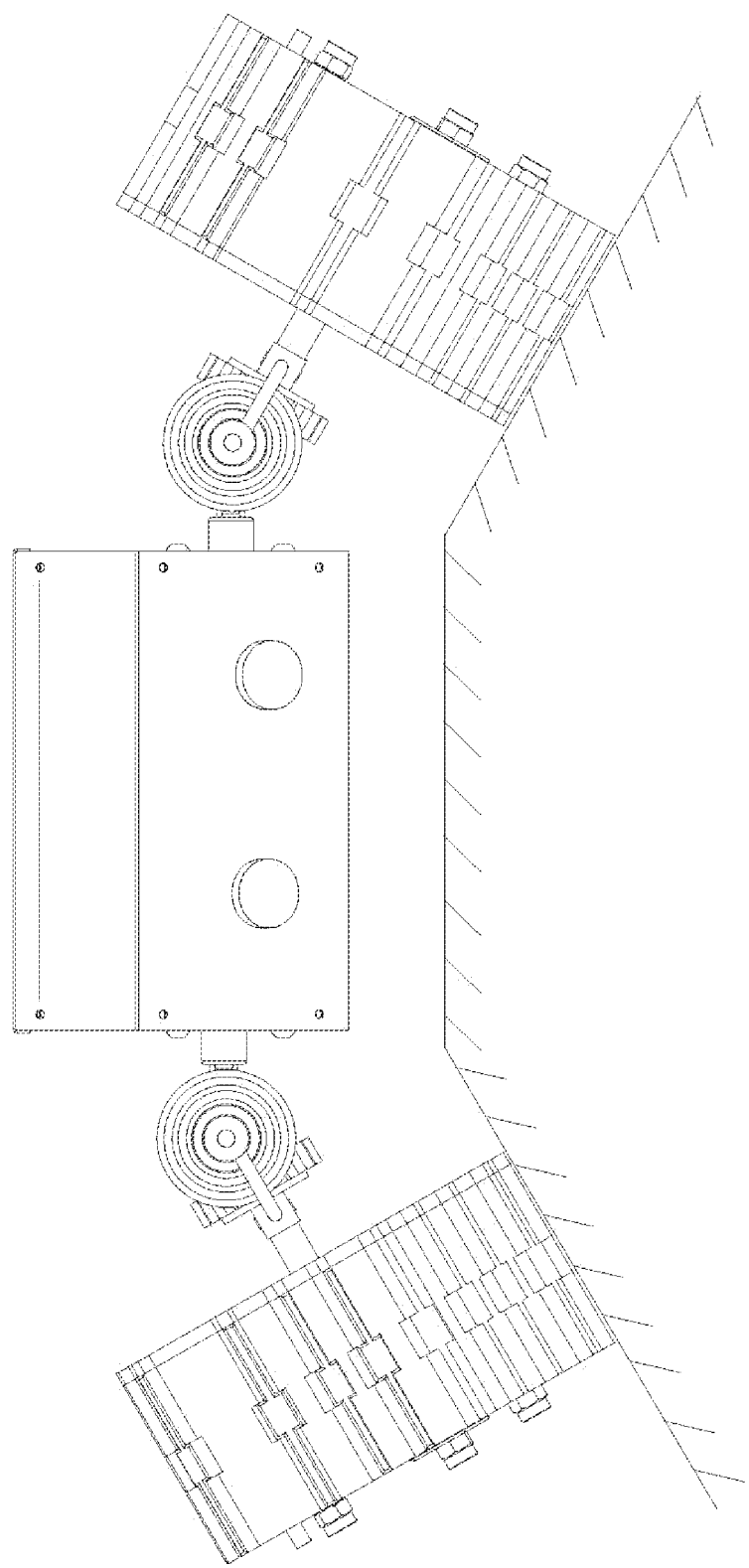
FIG. 11 is a status diagram of the adjusted special robot in the present disclosure when walking through the "/\"-shaped pavement.
Figure 12:
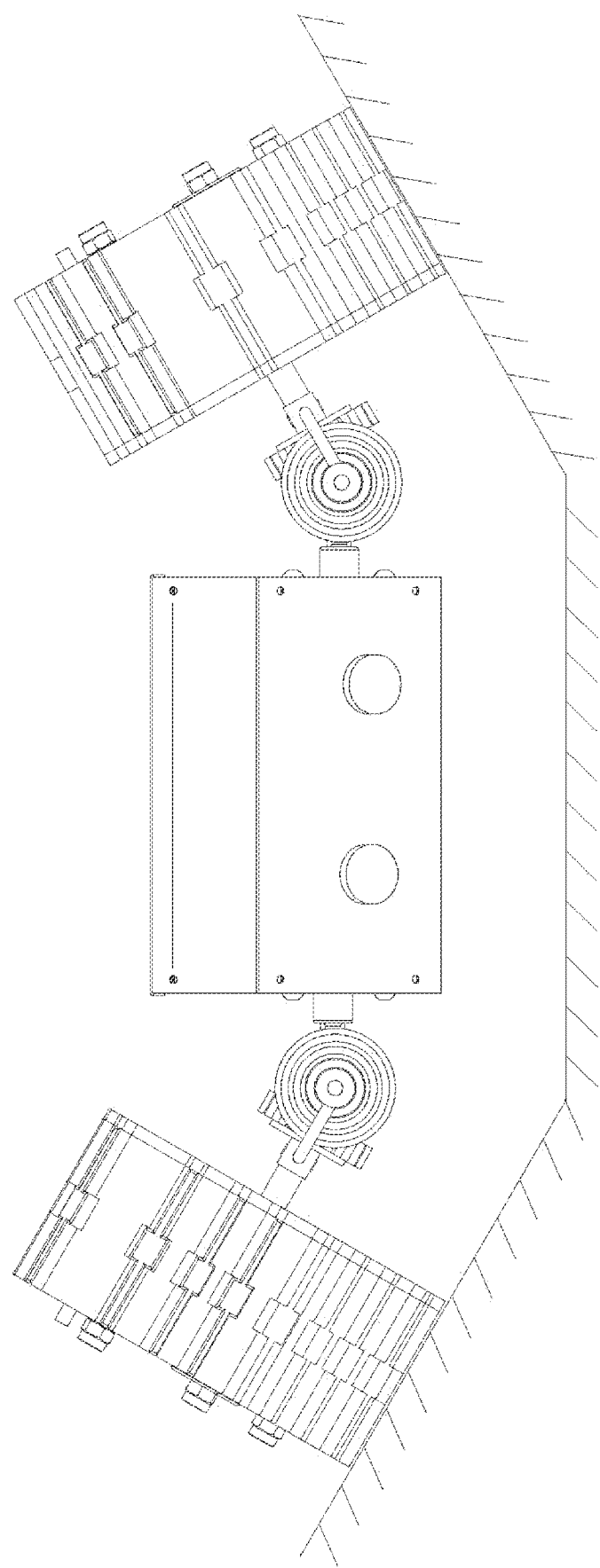
FIG. 12 is a status diagram of the adjusted special robot in the present disclosure when walking through the "\/"-shaped pavement.

The present disclosure provides a special robot with complex terrain adaptive function and the motion and operation method thereof, which allows the suspension system and the crawler system to better attach pavement by changing the pitch and roll operation angle of the suspension structures on two sides of the crawler chassis, thereby improving the climbing and obstacle crossing ability of the chassis and solving problems such as low attachment degree, crawler lost and poor obstacle crossing ability and even turnover facing with the crawler in various complex pavement.

In combination with drawings, the present disclosure provides a special robot with complex terrain adaptive function comprising a crawler chassis 1, a shock absorption suspension assembly 2, a suspension adaptive adjustment assembly 3 and an electronic control assembly 4;

the crawler chassis 1 is a body of the special robot that achieves connecting, supporting and fixing functions with other assemblies and it comprises a chassis body 1-1, a cover plate 1-2 and a suspension supporting side plate 1-3, wherein the chassis body 1-1 is in a frame structure and two sides thereof are connected with the suspension supporting side plate 1-3 and the top side, the front side, the rear side and the bottom side thereof are connected and fixed with the stationary cover plate 1-2. The stationary cover plate 1-2 is in a planar structure and has 4 surfaces respectively configured on the top side, the front side, the rear side and the bottom side of the chassis body 1-1 to protect inner components (such as the power component 4) of the robot. The suspension supporting side plate 1-3 is a rectangular strip plate and numbered in two sets respectively fixed on two sides of the chassis body 1-1. The suspension supporting side plate 1-3 is a medium to connect the crawler chassis 1, the shock absorption suspension assembly 2 and the suspension adaptive adjustment assembly 3.

The shock absorption suspension assembly 2 can achieve the effect of attachment, friction rotation and shock absorption of the robot on the pavement and is the body for the robot to achieve the stability of obstacle crossing, which is numbered in 2 sets respectively configured on the suspension supporting side plate 1-3. Each set of the shock absorption suspension assembly 2 at least comprises a suspension body 2-1, a track roller 2-2, a driving wheel 2-3, a driven wheel 2-4, a load wheel 2-5, a tensioning mechanism 2-6 and a crawler 2-7.

The suspension body 2-1 is a planar structure and is connected to the suspension adaptive adjustment assembly 3 (specifically connected to the hollow shaft in the suspension adaptive adjustment assembly 3) through a holder. The suspension body 2-1 is configured with components such as the track roller 2-2, the driving wheel 2-3, the driven wheel 2-4, the load wheel 2-5 and the tensioning mechanism 2-6. The track roller 2-2 is configured on the upper side of the suspension body 2-1 to drag the crawler passively. The driving wheel 2-3 and the driven wheel 2-4 are respectively configured on the rear side and front side of the suspension body 2-1 and the driving wheel 2-3 acquires power from the power component 4 by the power transmission mechanism, dragging the crawler 2-7 to rotate and achieve movement of the robot. The load wheel 2-5 is provided at the bottom of the suspension body 2-1 through the holder for the sake of load-bearing. The tensioning mechanism 2-6 is configured inside the suspension body 2-1 and tensions the load wheel 2-5 in the suspension mechanism through an elastic element, thereby tensioning the crawler 2-7. The crawler 2-7 is configured on the outer contour consisting of the track roller 2-2, the driving wheel 2-3, the driven wheel 2-4 and the load wheel 2-5 and the tensioning mechanism 2-6.

The overall work effect of the shock absorption suspension assembly 2 is that the driving wheel 2-3 rotates to drag the crawler 2-7 for rotation. The track plates constituting the crawler 2-7 are forced to come into contact with the surface of the ground in turn and cyclically by the joint drive of the track roller 2-2, the driven wheel 2-4, the load wheel 2-5 and the tensioning mechanism 2-6, and thus are forced to move forward, leading to the movement of the crawler chassis 1.

The suspension adaptive adjustment assembly 3 achieves automatic adjustment on the angle of the shock absorption suspension assembly 2, which is provided at the two rear sides of the chassis body 1-1 respectively. Any one set of suspension adaptive adjustment assembly 3 comprises the following mechanisms of the steering motor 3-1, the primary gear 3-2, the secondary gear 3-3, the steering gear 3-4, the power transmission mechanism 3-5 and the fixing mechanism 3-6.

The steering motor 3-1 comprises a first steering motor 3-1-a and a second steering motor 3-1-b. The first steering motor 3-1-a and the second steering motor 3-1-b are placed parallelly and a first fixing rod 3-6-a is provided between them. The steering motor 3-1 is provided at the rear end of the suspension supporting side plate 1-3 and the rotation shaft thereof is configured with the primary gears 3-2. The steering motor 3-1 is also provided at both trailing ends of the "T"-shape first fixing rod 3-6-a through the holder.

The primary gear 3-2 comprises a first primary gear 3-2-a and a second primary gear 3-2-b, all of which are spur gears. The first primary gear 3-2-a and the second primary gear 3-2-b are respectively configured on the rotation shafts of the first steering motor 3-1-a and the second steering motor 3-1-b and are respectively engaged with the first secondary gear 3-3-a and the second secondary gear 3-3-b.

The secondary gear 3-3 comprises a first secondary gear 3-3-a and a second secondary gear 3-3-b, all of which are spur gears. The first secondary gears 3-3-a and the second secondary gear 3-3-b are symmetrically configured on two lateral sides of the "T"-shaped first fixing rod 3-6-a and have an axis perpendicular to the first primary gear 3-2-a and the second primary gear 3-2-b. The first secondary gear 3-3-a and the second secondary gear 3-3-b are connected by a rigid shaft, and the rigid shaft passes through the front end 3-6-a-1 of the first fixing rod.

The steering gear 3-4 is also a spur gear and is configured between the first secondary gear 3-3-a and the second secondary gear 3-3-b, engaging with the two first secondary gears 3-3-a and the second secondary gears 3-3-b. The steering gear 3-4 is fixed to the side of the second fixing rod 3-6-b through the hollow shaft 3-4-1 and its axis center is perpendicular to the secondary gear 3-3 and parallel to the primary gear 3-2. Outside the hollow shaft of the steering gear 3-4 is fixed to the rear end of the suspension body 2-1 and its axis is perpendicular to the plane of the suspension body 2-1.

The power transfer mechanism 3-5 mainly achieves the rotation power transmission from the power motor 4-4 to the driving wheel 2-3 and it comprises a driving shaft 3-5-a, a universal joint 3-5-b and a driven shaft 3-5-c. The driving shaft 3-5-a, the universal joint 3-5-b and the driven shaft 3-5-c are connected to form a power steering transmission mechanism. When the axis of the steering gear 3-4 presents as an intersection angle relative to the axis of "T"-shaped first fixing rod 3-6-a, the power can still achieve the transmission from the power motor 4-4 to the driving shaft 3-5-a to the universal joint 3-5-b to the driven shaft 3-5-c to-the driving wheel 2-3 by the steering function of the universal joint 3-5-b. The end of the driven shaft 3-5-c is configured at the axis center of the driving wheel 2-3. Generally, the power transmission mechanism is configured with a universal joint between the driving shaft and the driven shaft, ensuring that the normal power transmission will not be affected when angle deflection occurs to the driven shaft along with the shock absorption suspension assembly 2 (a certain intersection angle is produced between the driving shaft 3-5-a and the driven shaft 3-5-c).

The fixing mechanism 3-6 can achieve functions of supporting, connecting and fixing on the steering motor 3-1, the primary gear 3-2, the secondary gear 3-3, the steering gear 3-4 and the power transmission mechanism 5 etc. The fixing mechanism 3-6 comprises a first fixing rod 3-6-a and a second fixing rod 3-6-b, wherein the first fixing rod 3-6-a is a T-shaped hollow rod structure. The first steering motor 3-1-a and the second steering motor 3-1-b are connected to the trailing end of the first fixing rod 3-6-a and the first secondary gear 3-3-a and the second secondary gear 3-3-b are respectively connected to both front ends of the first fixing rod 3-6-a. The first secondary gear 3-3-a and the second secondary gear 3-3-b are connected through a rigid shaft, the rigid shaft passes through the front end 3-6-a-1 of the first fixing rod and both outside ends of the rigid shaft are configured with a shaft sleeve 3-6-c. The second fixing rod 3-6-b is in a U-shaped structure and stretches across the first secondary gear 3-3-a and the second secondary gear 3-3-b and both ends of the second fixing rod 3-6-b are respectively fixed to the shaft sleeves 3-6-c where the rigid shaft passes through both outside ends of the first secondary gear and the second secondary gear, wherein the second fixing rod 3-6-*b* as a whole presents as Π shape structure after connected to two sets of shaft sleeves 3-6-*c* and the second fixing rod is also a hollow rod structure. Where the middle place of the second fixing rod 3-6-*b* corresponds to the center of the steering gear 3-4 is connected with a fixing seat 3-6-*d* and the hollow shaft 3-4-1 connected to the steering gear 3-4 passes vertically through the fixing seat 3-6-*d*. The hollow shaft 3-4-1 can freely rotate in relative to the fixing seat 3-6-*d*.

The overall work effect of the suspension adaptive adjustment assembly 3 is:

(1) when two sets of steering motors, namely the first steering motor 3-1-*a* and the second steering motor 3-1-*b* in the steering motor 3-1 rotate towards the same direction (the rotation directions are the same, positive or reverse at the same time), two sets of secondary gears, namely the first secondary gear 3-3-*a* and the second secondary gear 3-3-*b* reversely rotate so as to achieve the positive or reverse rotation of the steering gear 3-4 engaged with the first secondary gear 3-3-*a* and the second secondary gear 3-3*b*, thereby leading to the rotation of the suspension body 2-1 connected to its hollow shaft, thereby achieving the adjustment on the pitch angle of the shock absorption suspension assembly 2.

(2) when two set of steering motors, namely the first steering motors 3-1-*a* and the second steering motor 3-1-*b* in the steering motor 3-1 rotates towards different directions (the rotation directions are different, positive to reverse or reverse to positive), two sets of secondary gears, namely the first secondary gear 3-3-*a* and the second secondary gear 3-3-*b* rotate towards the same direction so that the steering gear 3-4 engaged with the first secondary gear 3-3-*a* and the second secondary gear 3-3-*b* does not spin but oscillates and motions around the axis of the first secondary gear 3-3-*a* and the second secondary gear 3-3-*b*, thereby leading the suspension body 2-1 connected to its hollow shaft to rotate around the axis of the secondary gear 3-3 and achieving the adjustment on the roll angle of the shock absorption suspension assembly 2.

The electronic control assembly 4 is a mechanism for a robot to data collection, information integration, power actuation and decision controlling and it comprises a controller 4-1, a sensor 4-2, an actuator 4-3 and a power motor 4-4 and a power battery 4-5. The controller 4-1, the sensor 4-2 and the actuator 4-3 are configured on the chassis body 1-1, the controller 4-1 is connected to the sensor 4-2 and the actuator 4-3 can controls the actuator 4-3 to achieve control on the power motor 4-4 by collecting pavement parameters and making decisions. The power battery 4-5 can power the inner power-consuming elements in the robot. The sensor 4-2 is a laser or a visual sensor and provided on the front end of the crawler chassis 1-1 for detecting a terrestrial obstacle or a pavement shape. The actuator 4-3 achieves control on the power motor 4-4, the power motor 4-4 is configured with two sets symmetrically configured on two rear ends of the chassis body 1-1, an output shaft passes through a reduction gearbox and is connected to the driving shaft 3-5-*a* through a coupler.

A motion and operation method of the above special robot with complex terrain adaptive function, steps of the method are:

A: a conventional motion (advancing, drawing back and turning) and operation method of the special robot, where,
No further instructions are made here.

B: a motion and operation method of the special robot by adaptive obstacle crossing (by walking through "\/"-shaped, "/\"-shaped pavements), where, when the sensor 4-2 detects that the pavement where the special robot will walk through is complex and rough, the controller 4-1 actuates the robot to motion according to the conventional power actuation method in the above-mentioned steps A while performing the following control motions on the shock absorption suspension assembly 2 by actuating the suspension adaptive adjustment assembly 3 through the actuator 4-3 to achieve the adaptive obstacle crossing function on complex and tough pavement conditions, specifically the motion and operation method of the special robot by adaptive obstacle crossing including:

(1) an operation method of the special robot when walking through "\/"-shaped pavement including:

for the shock absorption suspension assembly 2 and the suspension adaptive adjustment assembly 3 located in the left side of the crawler chassis 1, procedures are:

① when the controller 4-1 detects that the special robot is about to walk through pavement with a "\/"-shaped cross section through the sensor 4-2, the controller 4-1 controls the actuator 4-3 for actuation of the first steering motor 3-1-*a* and the second steering motor 3-1-*b* in the left side to reversely and positively rotate respectively while the first secondary gear 3-3-*a* and the second secondary gear 3-3-*b* positively rotate at the same time;

② the steering gear 3-4 engaged with the first secondary gear 3-3-*a* and the second secondary gear 3-3-*b* does not spin while the steering gear 3-4 oscillates and motions positively along with the axle center of the first secondary gear 3-3-*a* and the second secondary gear 3-3-*b*;

③ the suspension body 2-1 in the left side connected to the hollow rotation shaft of the steering gear 3-4 rotates positively around the axel center of the secondary gears 3-3 to lead to an increase of the deflection angle (roll angle) of the shock absorption suspension assembly 2 in relative to the crawler chassis 1 and finally achieve the attachment adaption of mechanisms such as the load wheel 2-5 and crawler 2-7 in the shock absorption suspension assembly 2 to the "\/" pavement.

④ for the shock absorption suspension assembly 2 and the suspension adaptive adjustment assembly 3 located in the right side, procedures are the same with the above-mentioned ones.

(2) an operation method of the special robot when walking through "/\"-shaped pavement including:

for the shock absorption suspension assembly 2 and the suspension adaptive adjustment assembly 3 located in the left side of the crawler chassis 1, procedures are:

① when the controller 4-1 detects that the special robot is about to walk through "/\"-shaped pavement through the sensor 4-2, the controller 4-1 controls the actuator 4-3 for actuation of the first steering motor 3-1-*a* and the second steering motor 3-1-*b* in the left side to positively and positively rotate respectively while the first secondary gear 3-3-*a* and the second secondary gear 3-3-*b* reversely rotate at the same time;

② the steering gear 3-4 engaged with the first secondary gear 3-3-*a* and the second secondary gear 3-3-*b* does not spin while the steering gear 3-4 oscillates and motions reversely along with the axle center of the first secondary gear 3-3-*a* and the second secondary gear 3-3-*b*;

③ the suspension body 2-1 in the left side connected to the hollow rotation shaft of the steering gear 3-4 rotates reversely around the axel center of the secondary gears 3-3 to lead to a decrease of the deflection angle (roll angle) of the shock absorption suspension assembly 2 in relative to the crawler chassis 1 and finally achieve the attachment adaption of mechanisms such as the load wheel 2-5 and the crawler 2-7 in the shock absorption suspension assembly 2 to the "/\" pavement.

④ for the shock absorption suspension assembly 2 and the suspension adaptive adjustment assembly 3 located in the right side, procedures are the same with the above-mentioned ones.

(3) an operation method of the special robot when walking through a lower-to-higher-shaped pavement lower in front and higher behind including:

for the shock absorption suspension assembly 2 and the suspension adaptive adjustment assembly 3 located in the left side of the crawler chassis 1, procedures are:

① when the controller 4-1 detects that the special robot is about to walk through a lower-to-higher-shaped pavement through the sensor 4-2, the controller 4-1 controls the actuator 4-3 for actuation of the first steering motor 3-1-$a$ and the second steering motor 3-1-$b$ in the left side to reversely rotate at the same time while the first secondary gear 3-3-$a$ and the second secondary gear 3-3-$b$ reversely and positively rotate respectively;

② the steering gear 3-4 engaged with the first secondary gear 3-3-$a$ and the second secondary gear 3-3-$b$ starts to spin while the steering gear 3-4 rotates reversely;

③ the suspension body 2-1 in the left side connected to the hollow rotation shaft of the steering gear 3-4 rotates anticlockwise around the steering gear 3-4 to achieve a decrease adjustment of the pitch angle of the shock absorption suspension assembly 2, thus adapting a lower-to-higher pavement lower in front and higher and improving the attachment fitting ability of mechanisms such as the load wheel 2-5 and the crawler 2-7 in the shock absorption suspension assembly 2 to a lower-to-higher pavement;

④ for the shock absorption suspension assembly 2 and the suspension adaptive adjustment assembly 3 located in the right side, procedures are the same with the above-mentioned ones.

(4) an operation method of the special robot when walking through a higher-to-lower-shaped pavement higher in front and lower behind including:

for the shock absorption suspension assembly 2 and the suspension adaptive adjustment assembly 3 located in the left side of the crawler chassis 1, procedures are:

① when the controller 4-1 detects that the special robot is about to walk through a higher-to-lower-shaped pavement through the sensor 4-2, the controller 4-1 controls the actuator 4-3 for actuation of the first steering motor 3-1-$a$ and the second steering motor 3-1-$b$ in the left side to positively rotate at the same time while the first secondary gear 3-3-$a$ and the second secondary gear 3-3-$b$ positively and reversely rotate respectively;

② the steering gear 3-4 engaged with the first secondary gear 3-3-$a$ and the second secondary gear 3-3-$b$ starts to spin while the steering gear 3-4 rotates positively;

③ the suspension body 2-1 in the left side connected to the hollow rotation shaft of the steering gear 3-4 rotates clockwise around the steering gear 3-4 to achieve an increase adjustment of the pitch angle of the shock absorption suspension assembly 2, thus adapting a higher-to-lower pavement higher in front and lower and improving the attachment fitting ability of mechanisms such as the load wheel 2-5 and the crawler 2-7 in the shock absorption suspension assembly 2 to a higher-to-lower pavement;

④ for the shock absorption suspension assembly 2 and the suspension adaptive adjustment assembly 3 located in the right side, procedures are the same with the above-mentioned ones.

(5) an operation method of the special robot when walking through other types of complex pavements including:

when the sensor 4-2 detects that the pavement where the special robot will walk through in the front is complex and rough, the controller 4-1 achieves the adjustment on the pitch angle and the roll angle of the shock absorption suspension assemblies 2 in left and right sides according to actuation methods from one or more combinations among methods (1)-(4) in the above-mentioned steps B after analyzing and making decisions so as to adapt different complex pavement environments, thereby achieving the adaptive obstacle crossing function on the complex and tough pavement conditions to ensure the motion stability, excellent obstacle crossing property and the pavement adaptability.

What is claimed is:

1. A special robot with complex terrain adaptive function comprising, a crawler chassis, a shock absorption suspension assembly, a suspension adaptive adjustment assembly and an electronic control assembly;

the crawler chassis comprises a chassis body being a frame structure, two side surfaces of the chassis body are configured with a suspension supporting side plate, a top surface, a bottom surface, a front surface and a rear surface of the chassis body are all configured with a stationary cover plate;

two sets of the shock absorption suspension assemblies are provided, respectively located on the two sides of the crawler chassis; the shock absorption suspension assembly comprises a suspension body and a crawler, two sides of the suspension body are configured with a driving wheel and a driven wheel, the upper part of the suspension body is configured with a track roller, the bottom part of the suspension body is configured with a load wheel connected with a tensioning mechanism by which the tensioned crawler is controlled, the crawler is configured to surround an outer contour consisting of the track roller, the driving wheel, the driven wheel and the load wheel;

two sets of the suspension adaptive adjustment assemblies are provided, respectively located close to rear of two sides of the chassis body and are used to achieve an angle adjustment of the shock absorption suspension assembly, each set of the shock absorption suspension assembly corresponds to one set of the suspension adaptive adjustment assembly;

the suspension adaptive adjustment assembly comprises a steering motor, a primary gear, a secondary gear, a steering gear, a power transmission mechanism and a fixing mechanism; the steering motor comprises a first steering motor and a second steering motor placed in parallel and all provided on the rear end of the suspension supporting side plate; the primary gear comprises a first primary gear and a second primary gear, the secondary gear comprises a first secondary gear and a second secondary gear, the first primary gear and the second primary gear are respectively configured on the rotation axis of the first steering motor and the second steering motor and are respectively engaged with the first secondary gear and the second secondary gear, the steering gear is configured between the first secondary gear and the second secondary gear and is respectively engaged with the first secondary gear and the second secondary gear; the center of the steering gear is connected to one end of a hollow shaft, and other end of the hollow shaft is fixedly connected to the rear end of the suspension body;

the power transmission mechanism comprises a driving shaft, an universal joint and a driven shaft, the universal joint is connected between the driving shaft and the driven shaft;

the fixing mechanism comprises a first fixing rod and a second fixing rod, the first fixing rod is in a T-shaped hollow rod structure, the first steering motor and the second steering motor are connected to a trailing end of the first fixing rod, the first secondary gear and the second secondary gear are respectively connected to both front ends of the first fixing rod, the first secondary gear and the second secondary gear are connected through a rigid shaft, the rigid shaft passes through the front end of the first fixing rod, both outside ends of the rigid shaft are configured with a shaft sleeve; the second fixing rod is in a U-shaped structure and stretches across the first secondary gear and the second secondary gear, both ends of the second fixing rod are respectively fixed to the shaft sleeves where the rigid shaft passes through both outside ends of the first secondary gear and the second secondary gear, the center of the second fixing rod aligning with the center of the steering gear is connected with a fixing seat, the hollow shaft connected to the steering gear passes vertically through the fixing seat and can freely rotate relative to the fixing seat;

the electronic control assembly comprises a controller, a sensor, an actuator and a power motor, the controller is connected to the sensor and the actuator, the actuator is respectively connected to the power motor and both the first steering motor and the second steering motor, the power motor is connected to the driving shaft of the power transmission mechanism, the driven shaft of the power transmission mechanism is connected to the driving wheel of the shock absorption suspension assembly.

2. The special robot with complex terrain adaptive function according to claim 1, wherein the electronic control assembly is provided on the chassis body and the suspension supporting side plate and the stationary cover plate are joined with each other to form a space for protecting the electronic control assembly.

3. The special robot with complex terrain adaptive function according to claim 1, wherein the first primary gear, the second primary gear, the first secondary gear, the second secondary gear and the steering gear are all spur gears; the axis of the first secondary gear is in alignment with that of the second secondary gear and are both vertical to the axis of the first primary gear and the second primary gear, the axis of the steering gear is parallel to the axis of the first primary gear and the second primary gear.

4. The special robot with complex terrain adaptive function according to claim 1, wherein the sensor is a laser sensor or a visual sensor, the sensor is provided on front end of the crawler chassis for detecting a terrestrial obstacle or a pavement shape; the controller controls the actuator to achieve control on the power transmission motor by collecting pavement parameters and making decisions; two sets of the power motor are configured symmetrically with each other and positioned on two rear ends of the chassis body, an output shaft passes through a reduction gearbox and is connected to the driving shaft of the power transmission mechanism through a coupler.

* * * * *